US012279560B2

(12) United States Patent
Ober et al.

(10) Patent No.: US 12,279,560 B2
(45) Date of Patent: Apr. 22, 2025

(54) HARVESTING DEVICE WITH GUIDE ELEMENT ADOPTING DIFFERENT POSITIONS

(71) Applicant: CLAAS Saulgau GmbH, Bad Saulgau (DE)

(72) Inventors: Martin Ober, Trichtingen (DE); Raphael Juergen Scham, Ostrach (DE); Bernd Schneider, Hornstein/Bingen (DE); Mathias Schaeffer, Duermentingen (DE); Matthias Berger, Wolpertswende (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 634 days.

(21) Appl. No.: 17/550,360

(22) Filed: Dec. 14, 2021

(65) Prior Publication Data

US 2022/0183232 A1    Jun. 16, 2022

(30) Foreign Application Priority Data

Dec. 14, 2020  (DE) .......................... 102020133430.3

(51) Int. Cl.
*A01D 61/00*    (2006.01)
(52) U.S. Cl.
CPC .................................. *A01D 61/006* (2013.01)
(58) Field of Classification Search
CPC ....... A01D 61/006; A01D 57/20; A01D 43/10
See application file for complete search history.

(56) References Cited

U.S. PATENT DOCUMENTS

| 3,543,491 | A | * | 12/1970 | Lausch | .................. | A01D 43/10 |
| | | | | | | 56/192 |
| 3,683,602 | A | * | 8/1972 | Scarnato | ................ | A01D 57/28 |
| | | | | | | 56/192 |
| 3,721,073 | A | * | 3/1973 | Scarnato et al. | ........ | A01D 43/10 |
| | | | | | | 56/16.4 B |
| 3,881,301 | A | * | 5/1975 | Sawyer | ................ | A01D 43/107 |
| | | | | | | 56/192 |

(Continued)

FOREIGN PATENT DOCUMENTS

| DE | 4122511 A1 | * | 1/1993 | ............. A01D 43/10 |
| DE | 102005050157 A1 | * | 5/2007 | ............. A01D 43/10 |

(Continued)

OTHER PUBLICATIONS

European Patent Office Search Report; 7 pages; Aug. 2, 2022.

*Primary Examiner* — Arpad Fabian-Kovacs

(57) ABSTRACT

Harvesting device (10) of an agricultural harvesting machine, having a mower (11) for mowing harvested crops, having a conditioning apparatus (14) with conditioning rolls (15, 16) arranged downstream of the mower (11) for conditioning the mown harvested crops, having a transverse conveying apparatus (18) arranged downstream of the conditioning apparatus (14) for conveying the conditioned harvested crops, having a guide element (20) in order to transfer the conditioned harvested crops from the conditioning apparatus (15) onto the transverse conveying apparatus (18), wherein the guide element (20) is configured to be deflectable such that the guide element (20) adopts a position as a function of a harvested crop mass flow to be transferred from the conditioning apparatus (15) onto the transverse conveying apparatus (18).

18 Claims, 2 Drawing Sheets

(56) References Cited

U.S. PATENT DOCUMENTS

| | | | | |
|---|---|---|---|---|
| 4,099,364 A * | 7/1978 | Kanengieter | A01D 57/28 | 56/192 |
| 4,212,142 A * | 7/1980 | Miner | A01D 43/10 | 56/14.4 |
| 4,217,746 A * | 8/1980 | Cicci | A01D 57/24 | 56/192 |
| 5,450,717 A * | 9/1995 | Delperdang | A01D 84/00 | 56/366 |
| 5,507,139 A * | 4/1996 | Delperdang | A01D 84/00 | 56/366 |
| 7,059,108 B1 * | 6/2006 | Rosenbalm | A01D 82/00 | 56/16.4 R |
| 7,644,566 B2 * | 1/2010 | Diederich, Jr. | A01D 41/14 | 56/190 |
| 8,430,732 B1 * | 4/2013 | Totten | A01D 34/667 | 56/189 |
| 9,930,832 B2 * | 4/2018 | Jespersen | A01D 43/003 | |
| 2008/0120956 A1 * | 5/2008 | Gradoz | A01D 43/10 | 56/157 |
| 2009/0313964 A1 * | 12/2009 | McLean | A01D 43/10 | 56/192 |
| 2011/0302897 A1 | 12/2011 | Hoffman et al. | | |
| 2017/0280627 A1 * | 10/2017 | Treffer | A01D 43/086 | |
| 2018/0325028 A1 * | 11/2018 | Rotole | A01D 41/1243 | |

FOREIGN PATENT DOCUMENTS

| | | | | |
|---|---|---|---|---|
| DE | 102010010862 A1 | | 9/2011 | |
| DE | 102012000301 A1 * | | 7/2013 | A01D 43/10 |
| DE | 202019102625 U1 * | | 9/2020 | A01D 43/10 |
| EP | 1776859 A1 * | | 4/2007 | A01D 43/10 |
| KR | 20130016767 A * | | 2/2013 | A01D 34/76 |

* cited by examiner

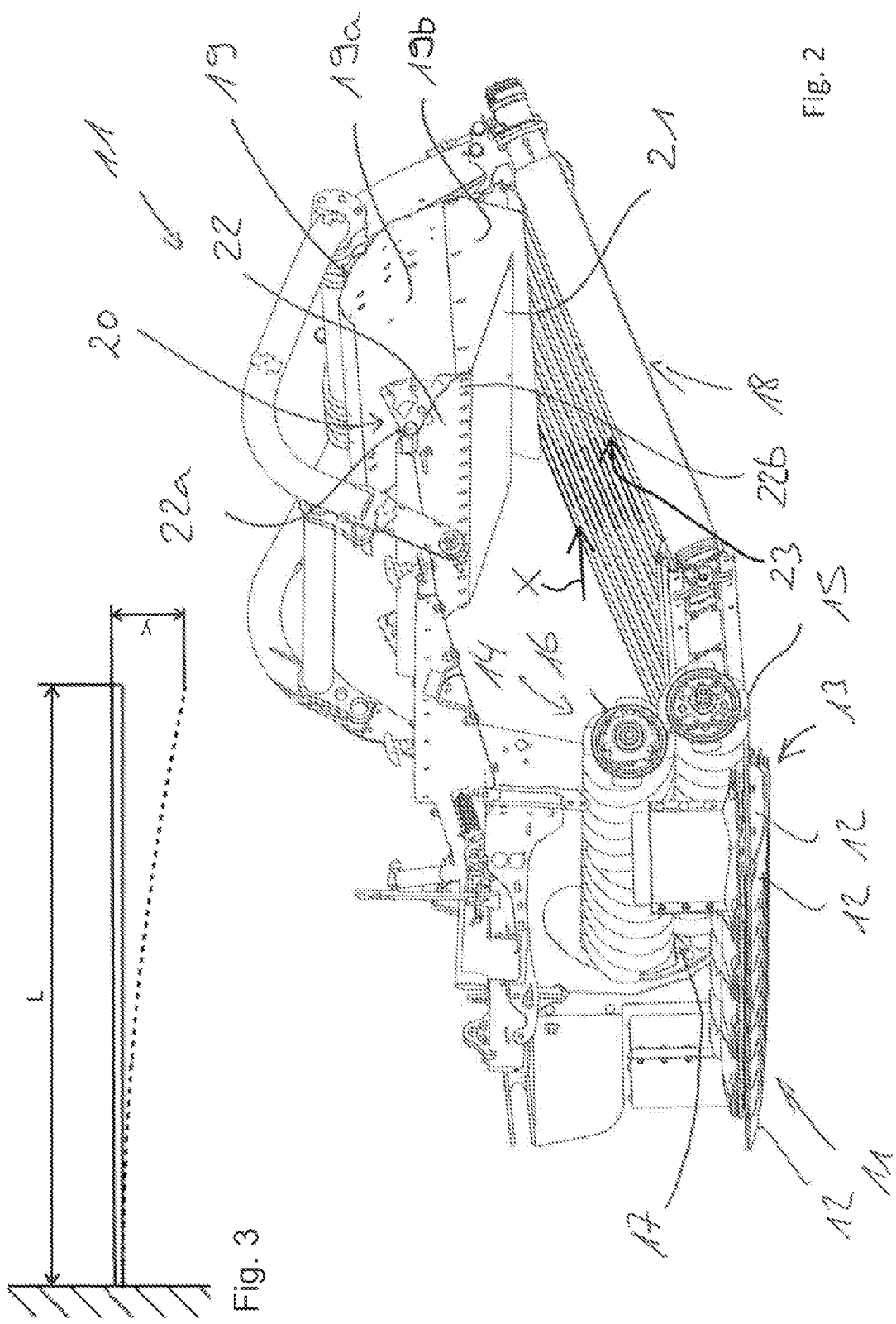

HARVESTING DEVICE WITH GUIDE ELEMENT ADOPTING DIFFERENT POSITIONS

The invention relates to a harvesting device of an agricultural harvesting machine according to the preamble of Claim 1. The invention further relates to an agricultural harvesting machine.

An agricultural harvesting machine which comprises an agricultural towing vehicle and a plurality of harvesting devices attached to the agricultural towing vehicle is disclosed in DE 10 2005 050 157 A1. The harvesting devices are mowing devices. It is disclosed in DE 10 2005 050 157 A1 that a harvesting device which is configured as a mowing device has a mower for mowing harvested crops, a conditioning apparatus arranged downstream of the mower for conditioning the harvested crops and a transverse conveying apparatus arranged downstream of the conditioning apparatus for conveying the conditioned harvested crops. It is also known that a mowing device has a guide element in order to transfer in a defined manner the harvested crops, which are conditioned by the conditioning apparatus, from the conditioning apparatus onto the transverse conveying apparatus. This guide element may be a metal plate, an apron, a mat or even a rod arrangement.

A further agricultural harvesting machine having a towing vehicle and having harvesting devices coupled to the towing vehicle is disclosed in EP 1 106 051 B1. The harvesting devices have transverse conveying apparatuses which are positioned obliquely and namely such that said transverse conveying apparatuses extend obliquely to the rear, when viewed in the conveying direction of the transverse conveying apparatus.

In particular, when the quantity or the mass of the harvested crop flow which is to be transferred from the conditioning apparatus onto the transverse conveying apparatus varies, in the case of harvesting devices known from the prior art it may lead to an interrupted or uneven crop stream. This is a drawback.

Proceeding therefrom, it is the object of the present invention to provide a novel harvesting device and an agricultural harvesting machine.

This object is achieved by a harvesting device according to Claim 1.

According to the invention, the guide element is configured to be deflectable such that the guide element adopts a position as a function of a harvested crop mass flow to be transferred from the conditioning apparatus onto the transverse conveying apparatus. The harvesting device according to the invention has the deflectable guide element. The guide element is deflectable as a function of the harvested crop mass flow. Thus the harvested crops may always be transferred in a defined manner from the conditioning apparatus onto the transverse conveying apparatus. An interrupted or uneven crop stream may thus be effectively prevented.

Preferably, in the presence of a relatively small harvested crop mass flow the guide element adopts a first position, whereas in the presence of a relatively large harvested crop mass flow the guide element adopts a deflected position relative to the first position. Thus the harvested crops may always be transferred in a defined manner from the conditioning apparatus onto the transverse conveying apparatus. An interrupted or uneven crop stream may be prevented. Similarly, it is advantageously possible to prevent the harvested crops from being thrown against the rear wall of the transverse conveyor.

According to an advantageous development, the guide element has a flexible cloth or a flexible mat and/or a pivotable flap. Preferably the flexible cloth or the flexible mat is fastened to the pivotable flap in order to be able to vary or to adjust a basic position or initial position of the cloth or the mat. This embodiment is preferred in order to take account of a variable harvested crop mass flow and for a high-quality transfer of the harvested crops from the conditioning apparatus onto the transverse conveying apparatus.

A freely pivotable flap may also be provided, said flap preferably being deflectable counter to the spring force of a spring element, in particular being passively controlled as a function of the harvested crop mass flow. In the case of an active control of the flap, the harvested crop mass flow is detected by measuring technology and the flap is actively controlled as a function thereof.

According to an advantageous development, the guide element is configured such that an ejection channel is preferably conically enlarged upwardly and/or to the rear, when viewed in the conveying direction of the transverse conveying apparatus. In this manner the transfer of the conditioned harvested crops from the conditioning apparatus onto the transverse conveying apparatus may be further improved.

According to an advantageous development, the guide element is configured such that the guide element is longer and protrudes relative to the transverse conveying apparatus, when viewed in the conveying direction of the transverse conveying apparatus. This development serves for improving the discharge of the harvested crops from the transverse conveying apparatus.

Preferred developments of the invention are revealed from the subclaims and the following description. Exemplary embodiments of the invention are described in more detail with reference to the drawing, without being limited thereto.

In the drawing:

FIG. 2 shows a perspective view of the harvesting device;

FIG. 3 shows an illustration of the stiffness of the cloth or the mat.

Figure 1:
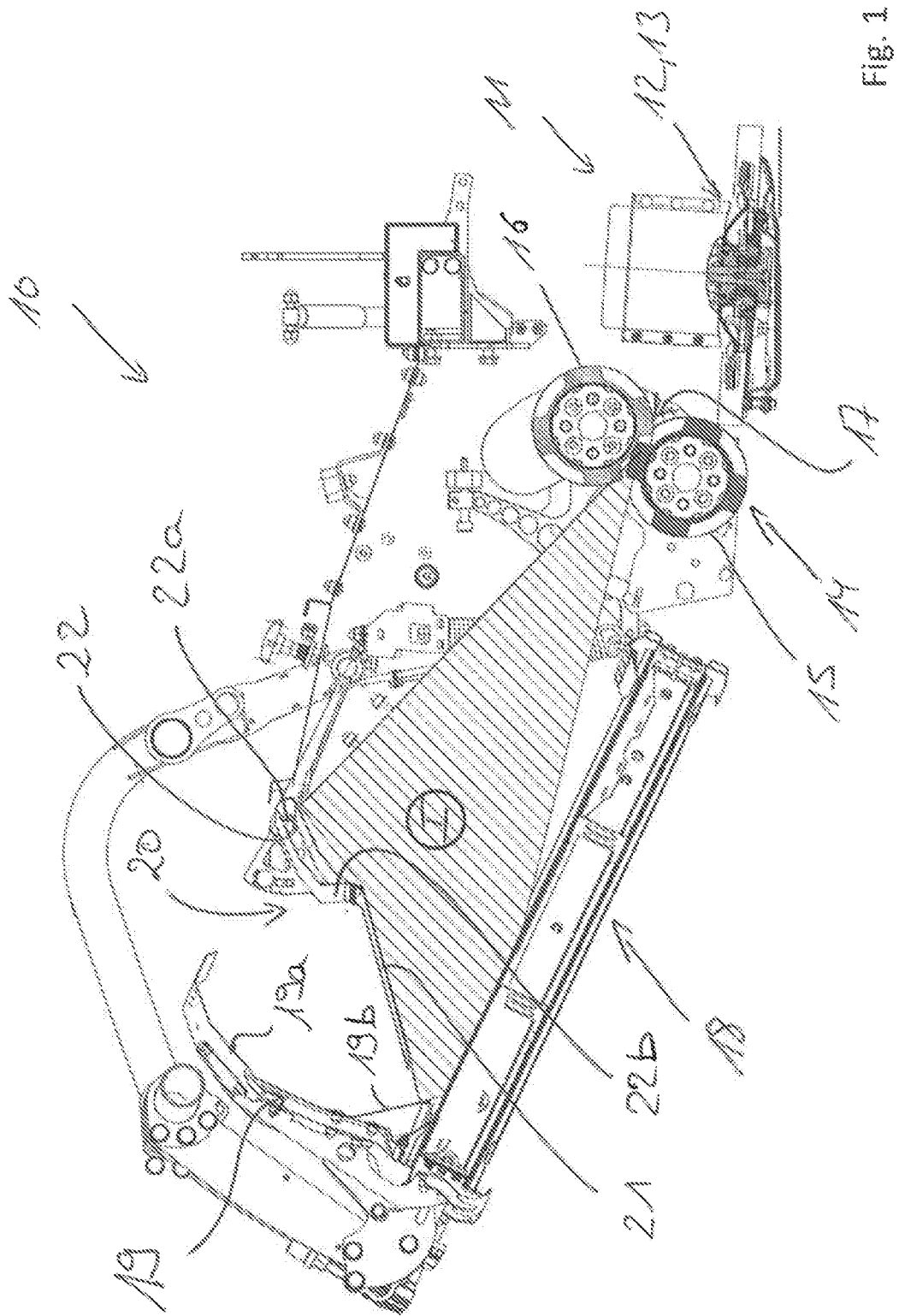
FIG. 1 shows a side view of a harvesting device.

The invention relates to a harvesting device of an agricultural harvesting machine.

FIG. 1 shows a side view of a harvesting device 10 according to the invention of an agricultural harvesting machine. The harvesting device 10 has a mower 11 consisting of a plurality of mowing members 12 which are positioned adjacent to one another to form a mower bar 13. The mower 11 serves for mowing harvested crops.

The harvesting device 10 also has a conditioning apparatus 14 arranged downstream of the mower 11, when viewed in the conveying direction of the harvested crops. The conditioning apparatus 14 has conditioning rolls 15 and 16 which define a gap 17, the harvested crops which have been mown by the mower 11 being conveyed through said gap for the conditioning.

The harvesting device 10 also has a transverse conveying apparatus 18 arranged downstream of the conditioning apparatus 14. The transverse conveying apparatus 18 is preferably a circulating belt conveyor which transports the mown and conditioned harvested crops transversely to the mower 11 and transversely to the conditioning apparatus 14.

In FIG. 2 the conveying direction of the transverse conveying apparatus 18 is illustrated by an arrow X.

A rear wall 19 is arranged on a side of the transverse conveying apparatus 18 remote from the conditioning apparatus 14. This rear wall 19 has substantially two portions, namely an upper portion 19a and a lower portion 19b which is arranged between the upper portion 19a and the transverse conveying apparatus 18.

In FIG. 1 a hatched region I illustrates a funnel-like ejection region of the conditioning apparatus 14, in which the conditioning apparatus 14 ejects the mown and conditioned harvested crops and transfers them onto the transverse conveying apparatus 18.

The harvesting device 18 also has a guide element 20. The guide element 20 serves for guiding and transferring the conditioned harvested crops from the conditioning apparatus 14 onto the transverse conveying apparatus 18.

The guide element 20 of the harvesting device 10 according to the invention is configured to be deflectable.

The guide element 20 adopts a position as a function of a harvested crop mass flow to be transferred from the conditioning apparatus 15 onto the transverse conveying apparatus 18.

In particular, in the presence of a relatively small harvested crop mass flow, the guide element 20 adopts a first position which is shown in FIGS. 1 and 2. In the presence of a relatively large harvested crop mass flow, the guide element 20 adopts a different or second position which is deflected relative to the first position.

A relatively small harvested crop mass flow is intended to be understood to mean a harvested crop mass flow which is smaller than a first limit value. A relatively large harvested crop mass flow is intended to be understood to mean a harvested crop mass flow which is greater than a second limit value. Preferably, the first limit value corresponds to the second limit value. Relatively small harvested crop mass flows are produced, for example, in the case of grass or lucerne having growth heights of up to approximately 20 centimeters.

The guide element 20 may adopt a plurality of different positions as a function of the harvested crop mass flow and namely continuously between two end positions of the guide element 20 or discretely defined intermediate positions between the two end positions of the guide element 20.

The guide element 20 may have a flexible cloth 21 or a flexible mat and/or a pivotable flap 22.

In the exemplary embodiment shown, the guide element 20 has both a flexible cloth 21 and a pivotable flap 22, wherein the pivotable flap 22 is pivotable about a pivot axis 22a, and wherein the flexible cloth 21 is fastened to the flap 22 on a portion 22b of the flap 22 spaced apart from the pivot axis 22a.

The flexible cloth 21 may be deflected as a function of the harvested crop mass flow which is to be transferred from the conditioning apparatus 14 onto the transverse conveying apparatus 18. The flap 22 may be pivoted about the pivot axis 22a as function of the size of the harvested crop mass flow, in order to be able to vary a basic position or initial position of the cloth 21. A blocking of the flap 22 may be released in order to adjust the basic position or initial position, and after the adjustment the flap 22 is fixed again for the operation or the harvesting process.

Preferably rods are integrated in the flexible cloth 21 or in the flexible mat, said rods extending in the direction of an end of the flexible cloth 21 remote from the flap 22, when viewed from the portion 22b of the flap 22.

The guide element 20 is deflectable if a relatively large harvested crop mass flow is to be transferred from the conditioning apparatus 14 onto the transverse conveying apparatus 18, wherein in this case the flexible cloth 21 or the flexible mat is also deflected. In particular, since in FIG. 1 the flap 22 is deflected upwardly out of the position shown in FIG. 1, namely pivoted upwardly, the basic or initial position of the cloth 21 or the mat may be adapted to the larger harvested crop mass flow.

It may be provided that the guide element 20 is deflected passively as a function of the harvested crop mass flow. Alternatively, the guide element 20 may be actively deflected as a function of the harvested crop mass flow, for which purpose the harvested crop mass flow is then preferably detected by measuring technology and an actuator which actively deflects the guide element 20 is activated as a function thereof. In this case, the flap 22 is preferably actively pivoted and thus deflected.

In the case of the passive deflection, the pivotable flap 22 is preferably displaceable counter to the spring force of a spring element, not shown, from the first position shown in FIG. 1. The spring element pushes the flap 22 into the first position.

According to an advantageous development, the guide element 20 is configured such that even when said guide element adopts the first position of FIGS. 1, 2 and also when the guide element 20 is deflected out of the first position, an ejection channel 23 defined by the guide element 20 (see FIG. 2) is enlarged upwardly and/or is enlarged to the rear in the direction of the rear wall 19, when viewed in the conveying direction X of the transverse conveying apparatus 18. It is thereby taken into account that an increasing amount of harvested crops has to be conveyed by the transverse conveying apparatus 18, when viewed in the conveying direction X of the transverse conveying apparatus 18.

So that the flexible cloth 21 or the flexible mat is able to counter the incoming harvested crop mass flow with a sufficient resistance, the flexible cloth has to have a specific predetermined stiffness which runs from the clamping point toward the free end.

FIG. 3 illustrates the stiffness of the cloth 21 or the mat. To this end, the cloth 21 or the mat is fixedly clamped at one end—comparable with the clamping to the flap 22—and protrudes horizontally away from the clamping point. A cloth or a mat which is suitable for the harvesting device according to the invention should have a deflection y of a maximum of 100 millimeters when clamped in such a manner and a horizontal protruding length L of 200 millimeters under its own weight at an ambient temperature of approximately 20 degrees Celsius.

In the case of a freely pivotable flap which is deflectable counter to the spring force of a spring element, the spring element has a corresponding spring characteristic.

Alternatively, the freely pivotable flap is able to counter the harvested crop mass flow with a resistance solely by its own weight. In this case, the resistance force increases with the increasing deflection of the flap since the weight force achieves a greater lever arm. The flap could be replaced by a flexible cloth or a mat, a weight being attached thereto or to the lower end thereof.

Alternatively or additionally, the guide element 20 is configured such that, when viewed in the conveying direction X of the transverse conveying apparatus 18, the guide element 20 protrudes relative to the transverse conveying apparatus 18 and preferably also the rear wall 19. Thus the ejection of the harvested crops from the transverse conveying apparatus 18 so as to form a swath is improved.

The transverse conveying apparatus 18 is preferably positioned obliquely. A first oblique position may be embodied such that, as may be derived most clearly from FIG. 1, the transverse conveying apparatus 18 extends to the rear and upwardly, when viewed from the conditioning apparatus 14.

Additionally or alternatively, a second oblique position may be provided such that the transverse conveying apparatus 18 extends to the rear, when viewed in the conveying direction X of the transverse conveying apparatus 18. In other words, the transverse conveying apparatus 18 at the discharge end or ejection end thereof is at a greater distance from the conditioning apparatus 14 than at the other end thereof where the conveying section begins.

The invention further relates to an agricultural harvesting machine. Such a harvesting machine has an agricultural towing vehicle and at least one harvesting device according to the invention which is coupled to the towing vehicle.

Typically two harvesting devices according to the invention are coupled to an agricultural towing vehicle in a rear region thereof, the transverse conveying apparatuses thereof having conveying apparatuses which are oriented toward one another so that the harvested crops may be deposited in a region between the harvesting devices in a so-called center swath.

LIST OF REFERENCE NUMERALS

10 Harvesting device
11 Mower
12 Mowing member
13 Mower bar
14 Conditioning apparatus
15 Conditioning roll
16 Conditioning roll
17 Gap
18 Transverse conveying apparatus
19 Rear wall
19a Portion
19b Portion
20 Guide element
21 Cloth
22 Flap
22a Pivot axis
22b Portion
23 Ejection channel
L Protruding length
y Deflection

The invention claimed is:

1. A harvesting device (10) of an agricultural harvesting machine,
having a mower (11) for mowing harvested crops,
having a conditioning apparatus (14) with conditioning rolls (15, 16) arranged downstream of the mower (11) for conditioning mown harvested crops,
having a transverse conveying apparatus (18) arranged downstream of the conditioning apparatus (14) for conveying conditioned harvested crops,
having a guide element (20) in order to transfer the conditioned harvested crops from the conditioning apparatus (15) onto the transverse conveying apparatus (18),
characterized in that
the guide element (20) is configured to be deflectable and comprises a flexible cloth (21) or a flexible mat which has a predefined stiffness extending from the clamping point to the free end and has a deflection in the vertical direction (y) of at most 100 millimeters given a horizontal protruding length (L) of 200 millimeters under its own weight at an ambient temperature of approximately 20 degrees Celsius, such that the guide element (20) adopts a position depending on a harvested crop mass flow to be transferred from the conditioning apparatus (14) onto the transverse conveying apparatus (18), wherein the guide element (20) adopts a first position when a harvested crop mass flow is less than a first threshold value, whereas the guide element (20) adopts a deflected position relative to the first position when a harvested crop mass flow is greater than a second threshold value, wherein the guide element (20) can continuously adopt multiple different positions between the two end positions depending on the harvested crop mass flow.

2. The harvesting device according to claim 1, characterized in that the guide element (20) has a pivotable flap (22).

3. The harvesting device according to claim 1, characterized in that the flexible cloth (21) or the flexible mat is fastened to a pivotable flap (22).

4. The harvesting device according to claim 2, characterized in that the pivotable flap (22) is deflectable by being actively controlled as a function of the harvested crop mass flow.

5. The harvesting device according to claim 2, characterized in that the pivotable flap (22) is deflectable counter to a spring force.

6. The harvesting device according to claim 1, characterized in that the guide element (20) is configured such that an ejection channel (23) is enlarged upwardly, when viewed in the conveying direction of the transverse conveying apparatus (18).

7. The harvesting device according to claim 1, characterized in that the guide element (20) is configured such that an ejection channel (23) is enlarged to the rear.

8. The harvesting device according to claim 1, characterized in that the guide element (20) is configured such that the guide element (20) protrudes relative to the transverse conveying apparatus (18), when viewed in the conveying direction of the transverse conveying apparatus (18).

9. The harvesting device according to claim 1, characterized in that the transverse conveying apparatus (18) is positioned obliquely such that said transverse conveying apparatus extends to the rear and upwardly, when viewed from the conditioning apparatus (14).

10. The harvesting device according to claim 1, characterized in that the transverse conveying apparatus (18) is positioned obliquely such that said transverse conveying apparatus extends to the rear, when viewed in the conveying direction of the transverse conveying apparatus (18).

11. An agricultural harvesting machine,
having a towing vehicle,
having at least one harvesting device (10) according to claim 1 which is coupled to the towing vehicle.

12. The agricultural machine according to claim 11, characterized in that in the presence of a relatively small harvested crop mass flow the guide element (20) adopts a first position, whereas in the presence of a relatively large harvested crop mass flow the guide element (20) adopts a deflected position relative to the first position.

13. The agricultural machine according to claim 11, characterized in that the guide element (20) has a flexible cloth (21) or a flexible mat.

14. The agricultural machine according to claim 11, characterized in that the guide element (20) has a pivotable flap (22).

15. The agricultural machine according to claim 13, characterized in that the flexible cloth (21) or the flexible mat is fastened to a pivotable flap (22).

16. The agricultural machine according to claim 14, characterized in that the pivotable flap (22) is deflectable by being actively controlled as a function of the harvested crop mass flow.

17. The agricultural machine according to claim 14, characterized in that the pivotable flap (22) is deflectable counter to a spring force.

18. The agricultural machine according to claim 11, characterized in that the guide element (20) is configured such that an ejection channel (23) is enlarged upwardly, when viewed in the conveying direction of the transverse conveying apparatus (18).

* * * * *